US012598380B2

(12) United States Patent
Furumochi

(10) Patent No.: US 12,598,380 B2
(45) Date of Patent: Apr. 7, 2026

(54) ELECTRONIC DEVICE AND CONTROL METHOD THEREOF

(71) Applicant: CANON KABUSHIKI KAISHA, Tokyo (JP)

(72) Inventor: Hiroyuki Furumochi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 203 days.

(21) Appl. No.: 18/734,337

(22) Filed: Jun. 5, 2024

(65) Prior Publication Data

US 2024/0323522 A1 Sep. 26, 2024

Related U.S. Application Data

(63) Continuation of application No. 17/988,816, filed on Nov. 17, 2022, now Pat. No. 12,058,439.

(30) Foreign Application Priority Data

Nov. 25, 2021 (JP) ................................. 2021-191441

(51) Int. Cl.
| | |
|---|---|
| *H04N 23/66* | (2023.01) |
| *H04N 23/63* | (2023.01) |
| *H04N 23/667* | (2023.01) |
| *H04N 23/71* | (2023.01) |

(52) U.S. Cl.
CPC ........... *H04N 23/667* (2023.01); *H04N 23/63* (2023.01); *H04N 23/71* (2023.01)

(58) Field of Classification Search
CPC ....... H04N 23/667; H04N 23/63; H04N 23/71
See application file for complete search history.

(56) References Cited

U.S. PATENT DOCUMENTS

| | | | |
|---|---|---|---|
| 12,058,439 B2 * | 8/2024 | Furumochi | .......... H04N 23/665 |
| 2021/0075968 A1 | 3/2021 | Takayama | |

FOREIGN PATENT DOCUMENTS

| | | |
|---|---|---|
| JP | 2015-186234 A | 10/2015 |
| JP | 2020-184699 A | 11/2020 |

* cited by examiner

*Primary Examiner* — Lin Ye
*Assistant Examiner* — Fayez A Bhuiyan
(74) *Attorney, Agent, or Firm* — Cowan, Liebowitz & Latman, P.C.

(57) ABSTRACT

An electronic device comprises: an image sensor; an input unit used for inputting an instruction that accompanies switching of an actuation method of the image sensor; and a controller that switches the actuation method of the image sensor using either of a first switching method and a second switching method based on a predetermined condition according to an input of the instruction. In the first switching method, the actuation method is switched via a standby state of the image sensor according to the input of the instruction, and in the second switching method, the actuation method is switched at a timing of a start of a next frame immediately after the input of the instruction while actuating the image sensor at a predetermined frame rate.

8 Claims, 13 Drawing Sheets

F I G.  1
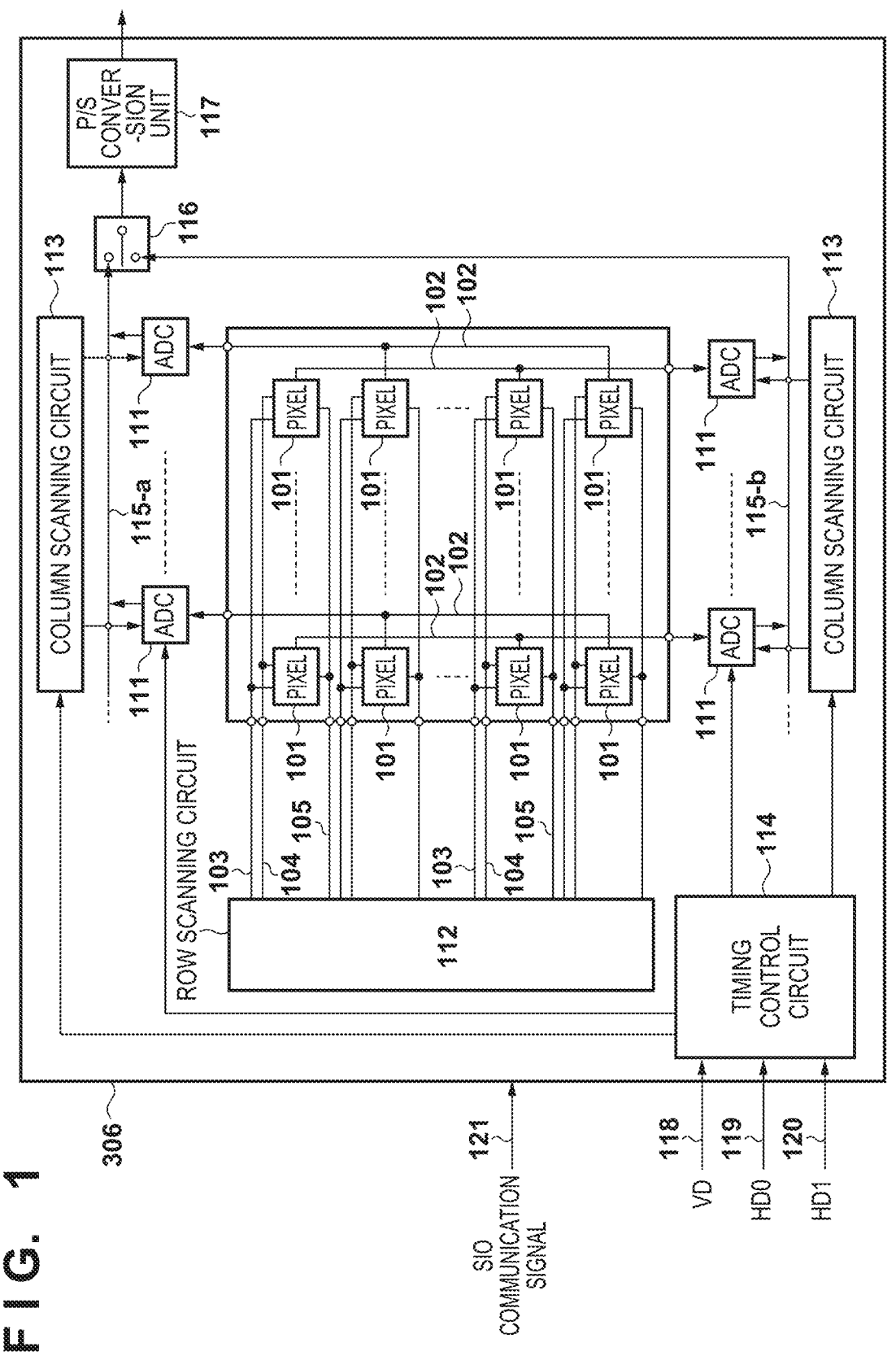

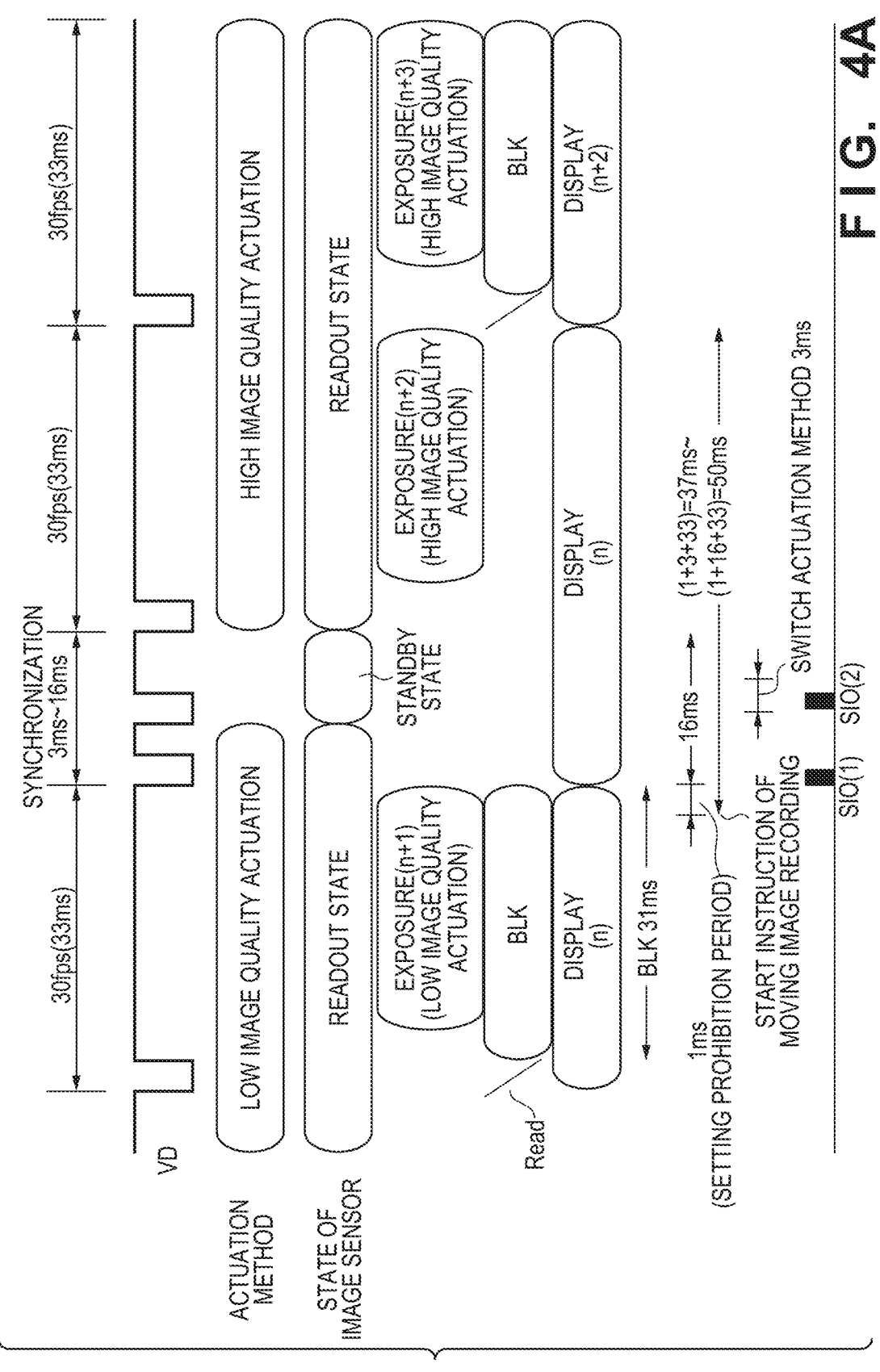
F I G. 4A

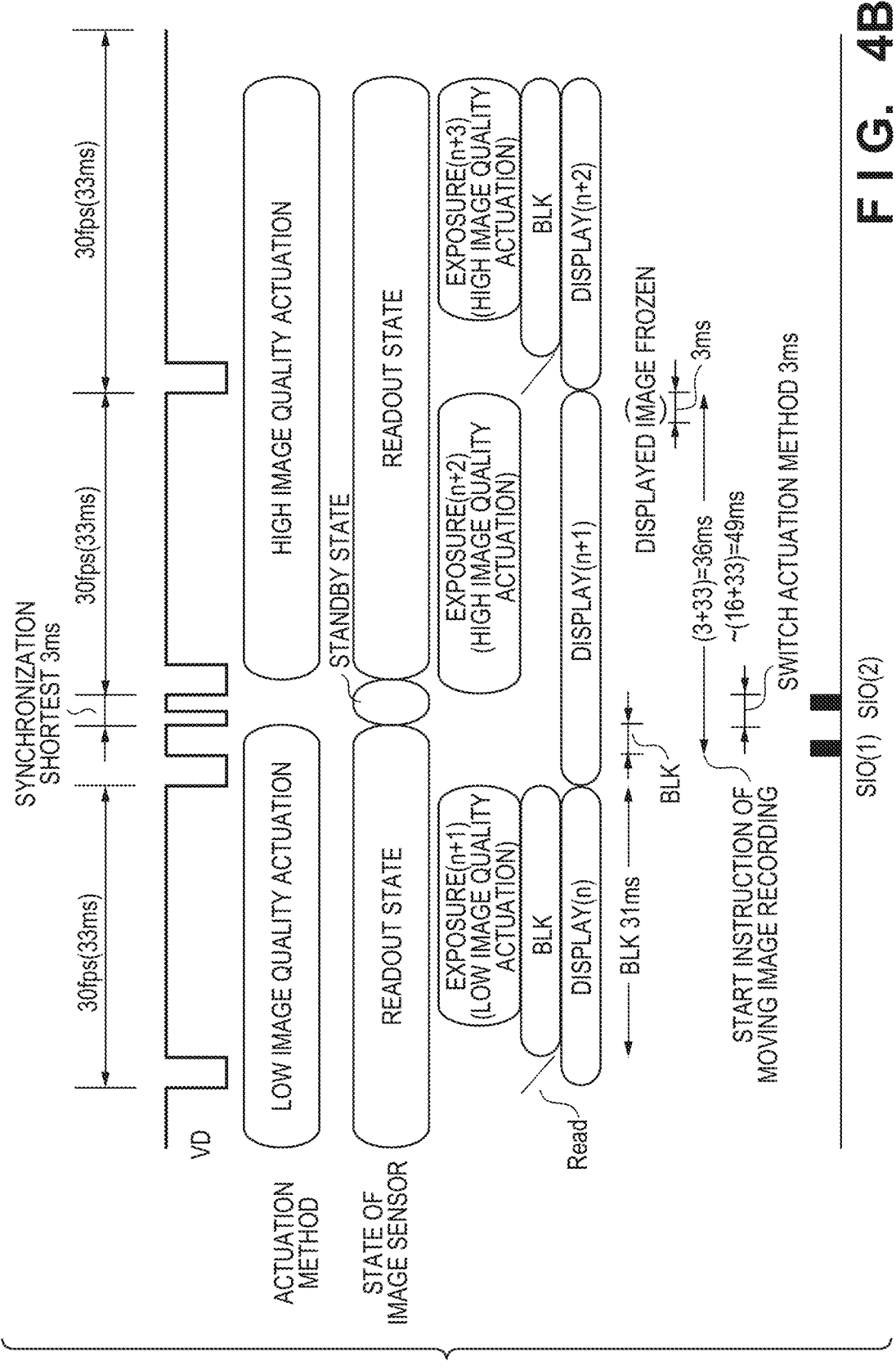
F I G. 4B

Figure 5B:
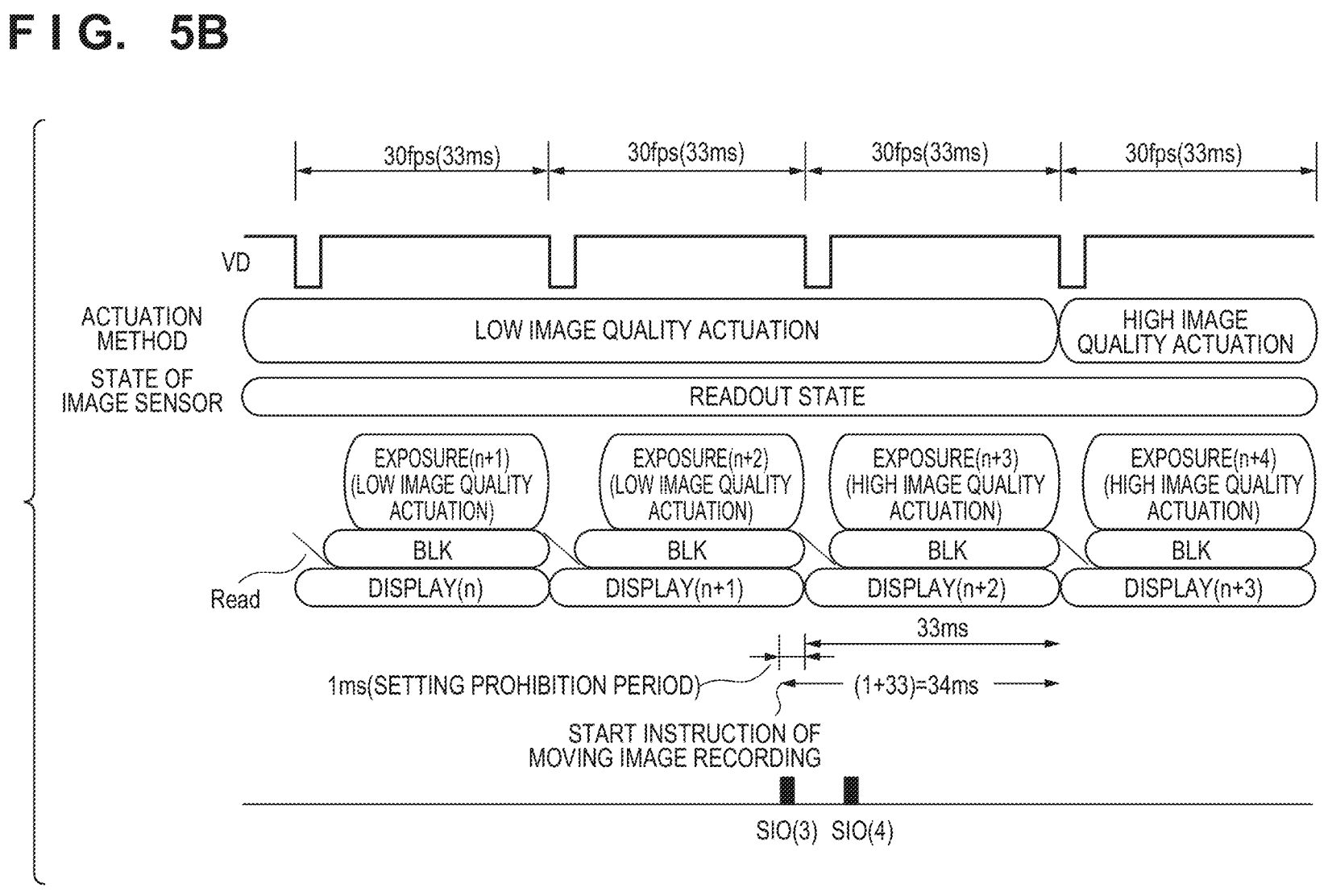

ACTUATION METHOD

30fps(33ms) | 30fps(33ms) | 30fps(33ms) | 30fps(33ms)

LOW IMAGE QUALITY ACTUATION | HIGH IMAGE QUALITY ACTUATION

STATE OF IMAGE SENSOR

READOUT STATE

Read

EXPOSURE(n+1) (LOW IMAGE QUALITY ACTUATION)
BLK
DISPLAY(n)

EXPOSURE(n+2) (LOW IMAGE QUALITY ACTUATION)
BLK
DISPLAY(n+1)

EXPOSURE(n+3) (HIGH IMAGE QUALITY ACTUATION)
BLK
DISPLAY(n+2)

EXPOSURE(n+4) (HIGH IMAGE QUALITY ACTUATION)
BLK
DISPLAY(n+3)

1ms(SETTING PROHIBITION PERIOD)

33ms (1+33)=34ms

START INSTRUCTION OF MOVING IMAGE RECORDING

SIO(3)  SIO(4)

F I G. 6
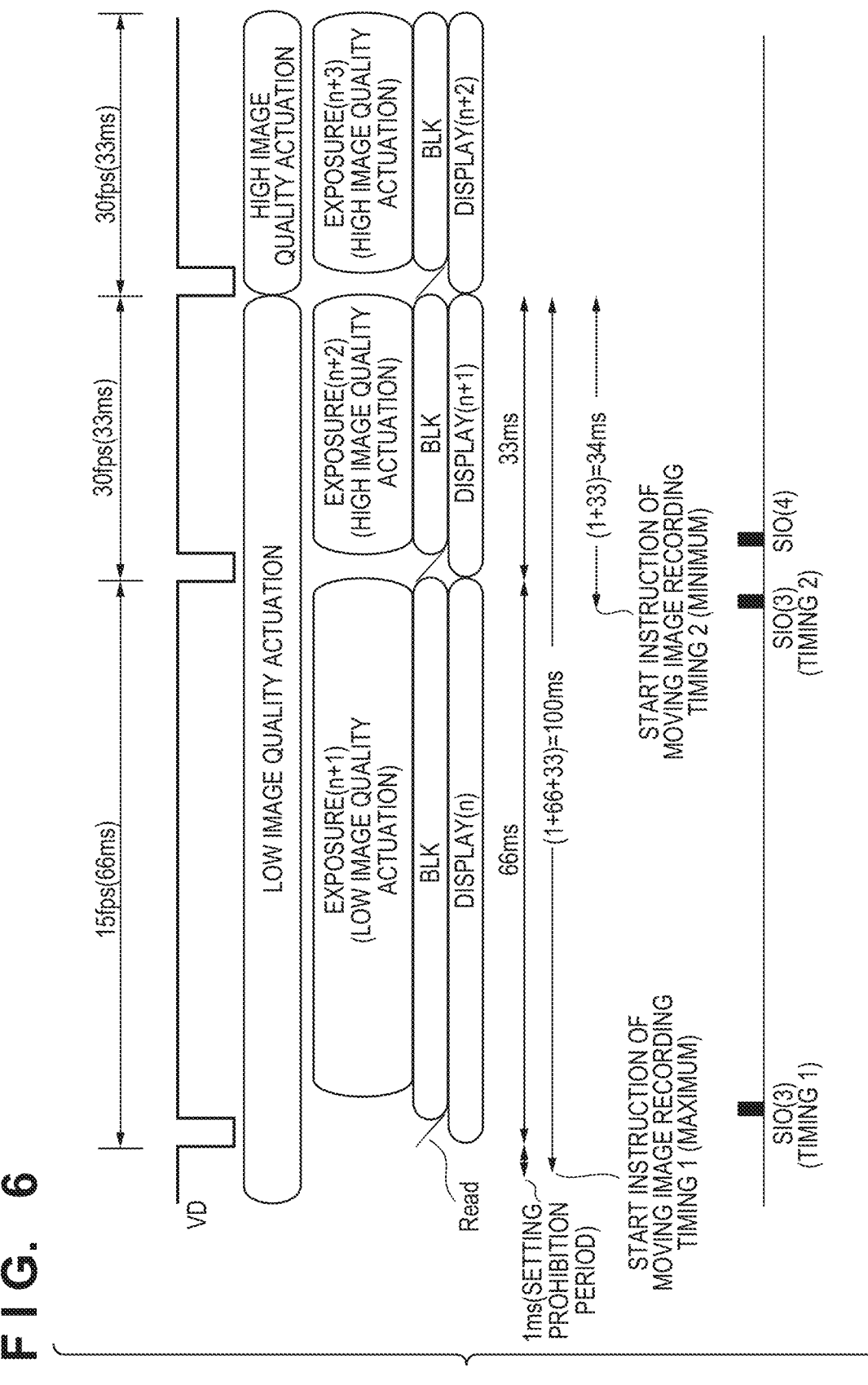

F I G. 7
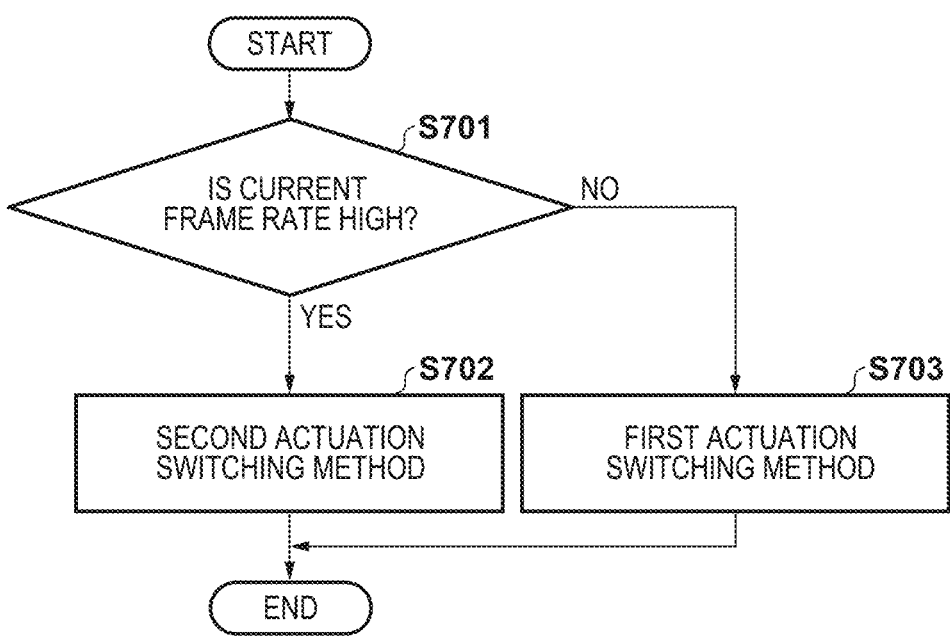
F I G. 8
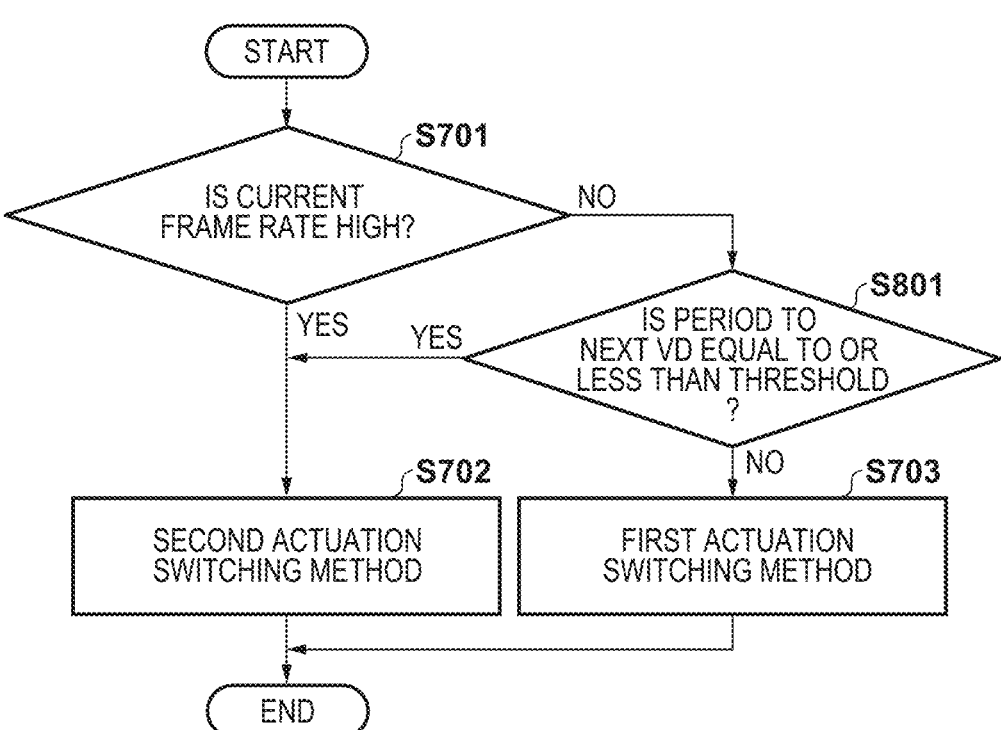

F I G. 9
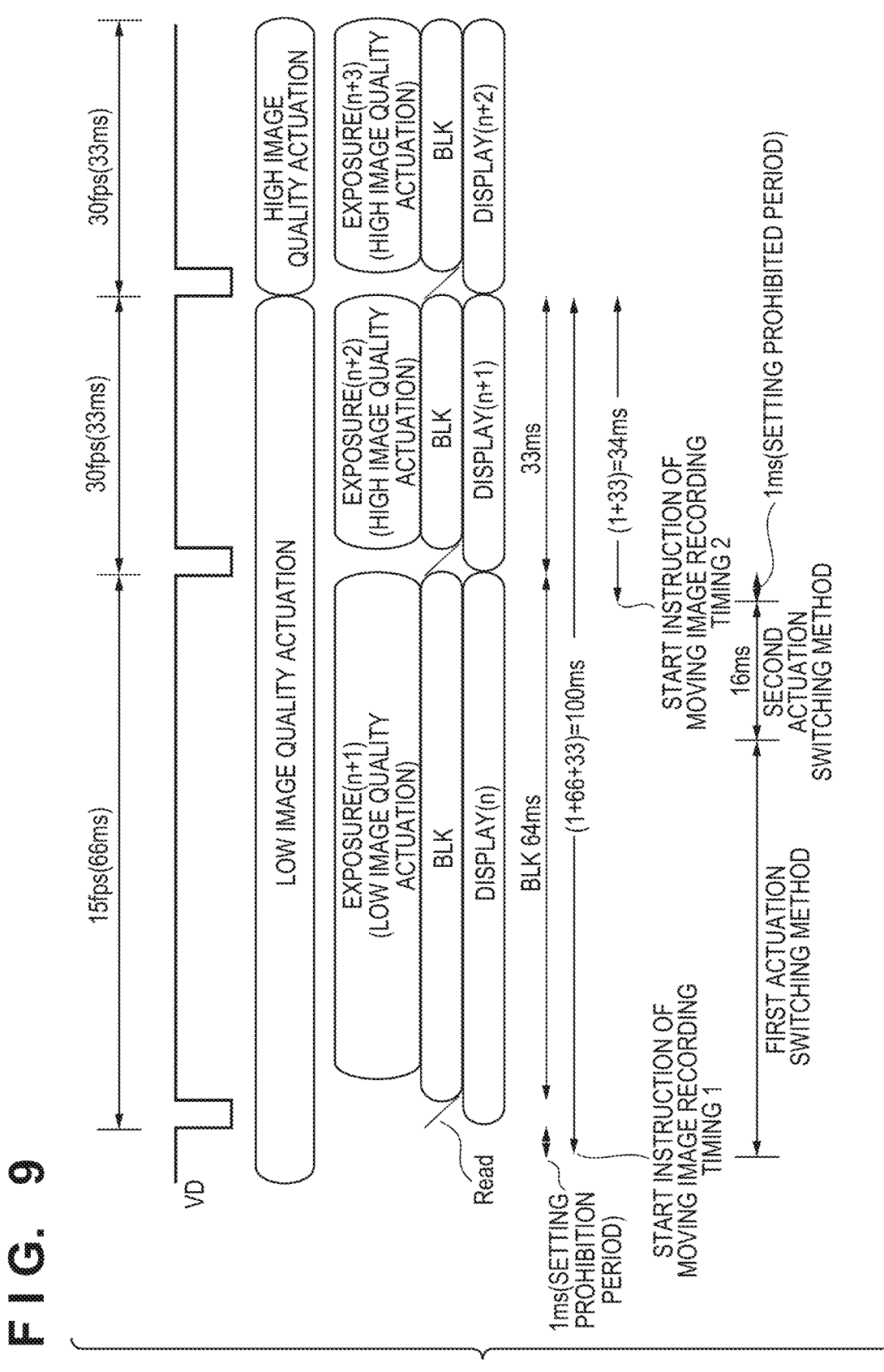

F I G. 11
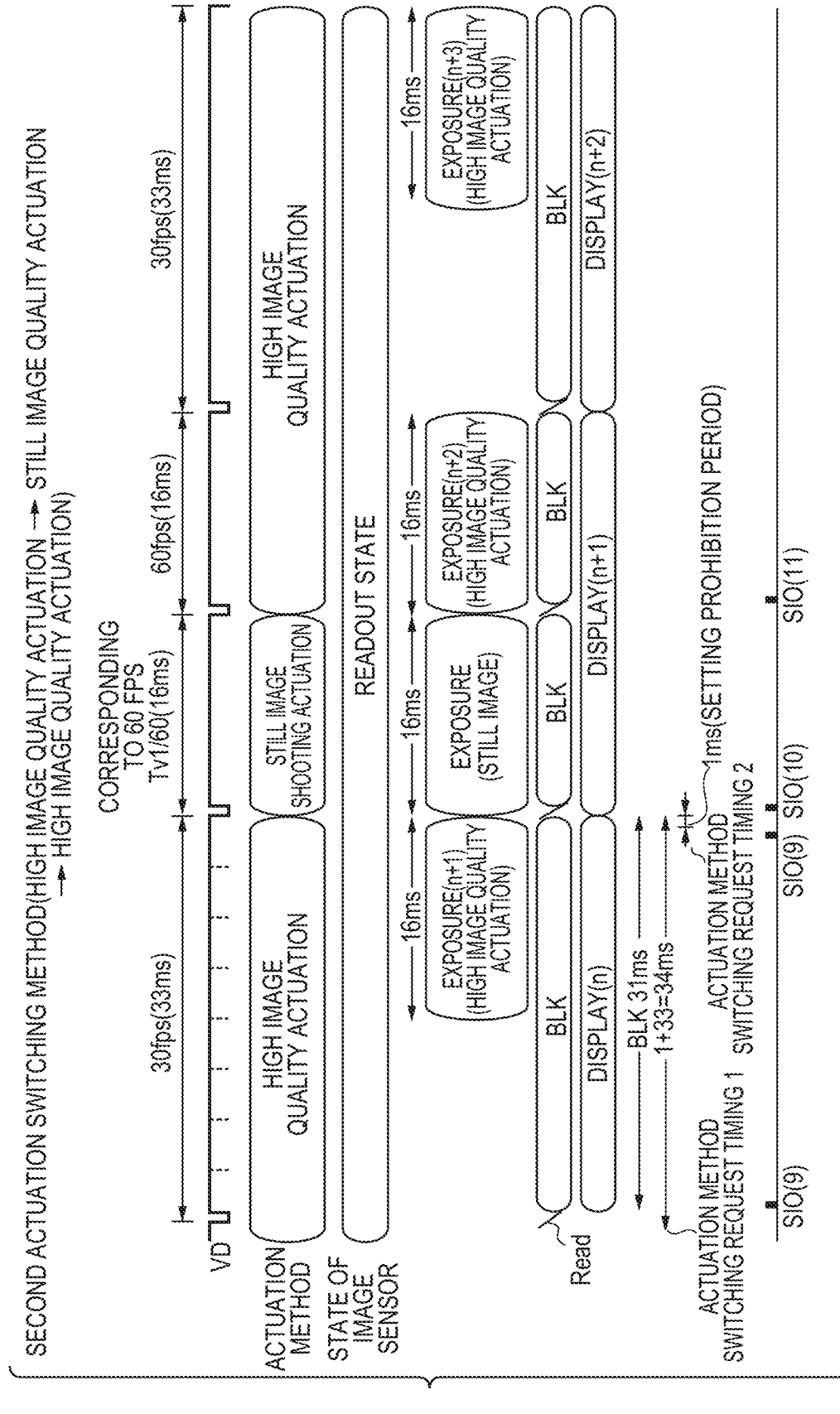

F I G. 12

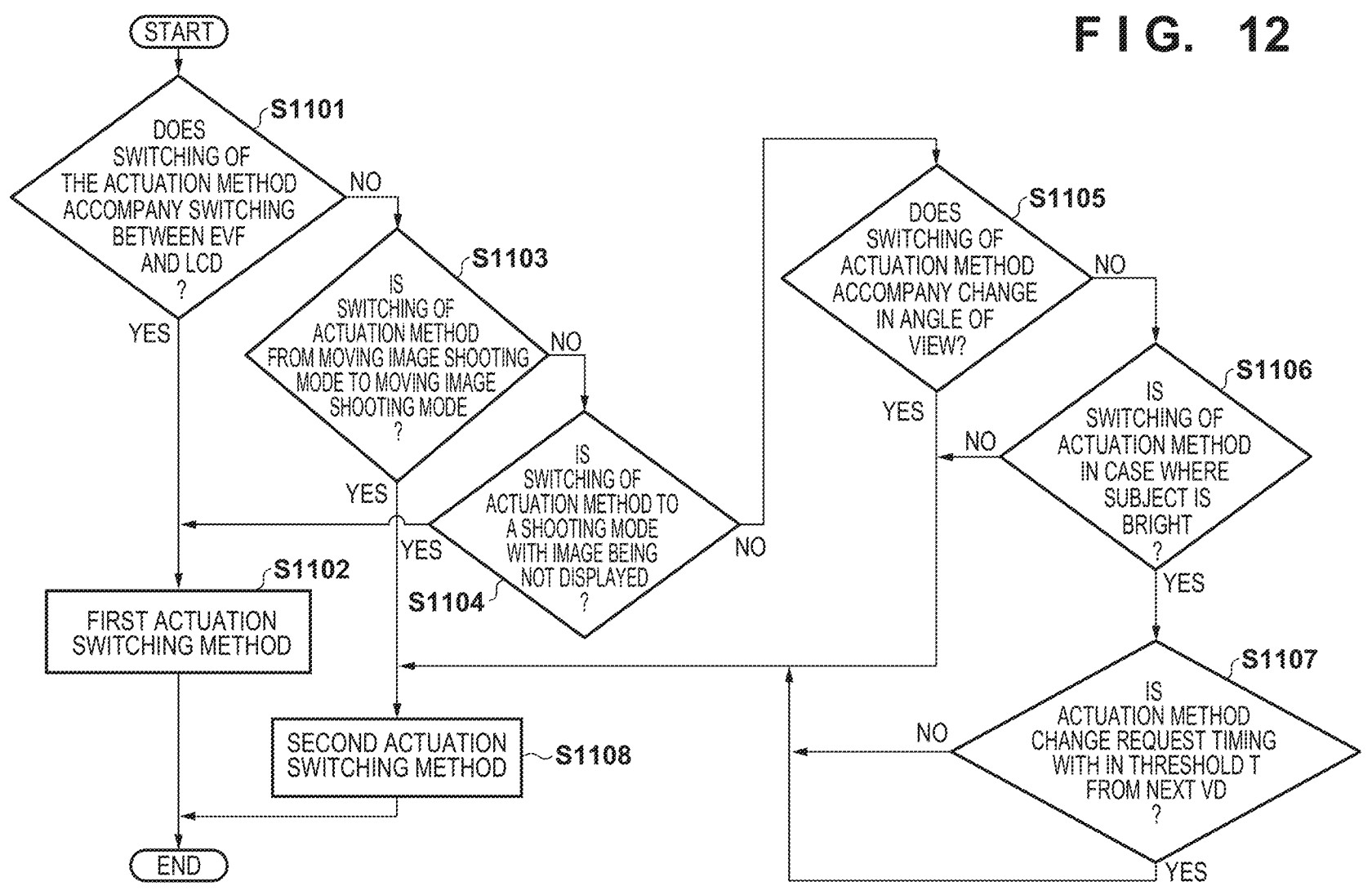

START

S1101

DOES SWITCHING OF THE ACTUATION METHOD ACCOMPANY SWITCHING BETWEEN EVF AND LCD ?

NO

YES

S1103

IS SWITCHING OF ACTUATION METHOD FROM MOVING IMAGE SHOOTING MODE TO MOVING IMAGE SHOOTING MODE ?

NO

YES

S1104

IS SWITCHING OF ACTUATION METHOD TO A SHOOTING MODE WITH IMAGE BEING NOT DISPLAYED ?

YES

NO

S1105

DOES SWITCHING OF ACTUATION METHOD ACCOMPANY CHANGE IN ANGLE OF VIEW?

NO

YES

S1106

IS SWITCHING OF ACTUATION METHOD IN CASE WHERE SUBJECT IS BRIGHT ?

YES

NO

S1107

IS ACTUATION METHOD CHANGE REQUEST TIMING WITHIN THRESHOLD T FROM NEXT VD ?

YES

NO

S1102

FIRST ACTUATION SWITCHING METHOD

S1108

SECOND ACTUATION SWITCHING METHOD

END

ELECTRONIC DEVICE AND CONTROL METHOD THEREOF

CROSS-REFERENCE TO RELATED APPLICATION

This application is a continuation of application Ser. No. 17/988,816, filed Nov. 17, 2022, the entire disclosure of which is hereby incorporated by reference.

BACKGROUND OF THE INVENTION

Field of the Invention

The present invention relates to an electronic device and a control method thereof, and more particularly to a technique for switching actuation methods of an image sensor in an electronic device.

Description of the Related Art

There are digital cameras and electronic devices with camera functions (hereinafter collectively referred to as "image capturing apparatuses") which can operate in a live view (LV) mode, moving image shooting mode, and still image shooting mode.

The LV mode is a shooting mode in which images obtained by developing an image signal output from an image sensor are displayed on a display device at a constant frame rate.

The moving image shooting mode is a shooting mode in which a moving image with a constant frame rate obtained by performing development processing on an image signal output from the image sensor is recorded on a recording medium. For moving image data recorded in the moving image shooting mode, there are recording sizes such as high-definition 4K and normal Full High Definition (FHD). Also, there are 60 fps, 30 fps, etc. as the frame rate for recording.

A still image shooting mode is a shooting mode in which a still image obtained by performing development processing on an image signal output from an image sensor is recorded on a recording medium. In the still image shooting mode, the recording size of the still image can be selected. For example, if the image sensor has 24 M pixels, the recording size may be 24 M-pixel-recording, 12 M-pixel-recording, and so forth.

Since the resolutions of image data is usually different between an LV image, a moving image, and a still image, the actuation methods of the image sensor are also different. Therefore, when changing the shooting mode, the actuation method of the image sensor is changed accordingly.

For example, when the LV mode is switched to the moving image shooting mode, the output of image data from the image sensor being actuated in the LV mode is temporarily stopped, and after switching the actuation method of the image sensor to that of the moving image shooting mode, the output of the image data from the image sensor is restarted. Therefore, an image of the previous frame may be displayed on the display device, or a fixed color image such as a black image may be displayed, because the image data does not exist.

Japanese Patent Laid-Open No. 2015-186234 discloses a structure in which image data is stored in a memory within an image sensor, and an image is read out from the memory, and discloses that, upon switching the actuation method, storage of image data that may become a defective frame is stopped, and image data stored before the switching of the actuation method is read out.

Further, Japanese Patent Laid-Open No. 2020-184699 discloses a method, when still image shooting is instructed during moving image shooting, of avoiding a state in which the displayed image is stopped (frame stop) by performing the still image shooting during a blanking period of the moving image shooting.

In the method described in Japanese Patent Application Laid-Open No. 2015-186234, image data stored before switching the actuation method is output from the image sensor, so the same image is kept displayed on the display device of the electronic device for two or more frames, and the displayed image becomes still.

Further, in the case of Japanese Patent Laid-Open No. 2020-184699, when the frame rate of the moving image shooting is low, the responsiveness from the instruction of the still image shooting to the start of the still image shooting is poor.

SUMMARY OF THE INVENTION

The present invention has been made in consideration of the above situation, and improves the responsiveness in switching between actuation methods of an image sensor.

According to the present invention, provided is an electronic device comprising: an image sensor; and one or more processors and/or circuitry which function as: an input unit used for inputting an instruction that accompanies switching of an actuation method of the image sensor; and a controller that switches the actuation method of the image sensor using either of a first switching method and a second switching method based on a predetermined condition according to an input of the instruction, wherein, in the first switching method, the actuation method is switched via a standby state of the image sensor according to the input of the instruction, and wherein, in the second switching method, the actuation method is switched at a timing of a start of a next frame immediately after the input of the instruction while actuating the image sensor at a predetermined frame rate.

Further, according to the present invention, provided is a control method of an electronic device comprising: switching, according to an input of an instruction that accompanies switching of an actuation method of an image sensor, the actuation method of the image sensor using either of a first switching method and a second switching method based on a predetermined condition, wherein, in the first switching method, the actuation method is switched via a standby state of the image sensor according to the input of the instruction, and wherein, in the second switching method, the actuation method is switched at a timing of a start of a next frame immediately after the input of the instruction while actuating the image sensor at a predetermined frame rate.

Furthermore, according to the present invention, provided is a non-transitory computer-readable storage medium, the storage medium storing a program that is executable by the computer, wherein the program includes program code for causing the computer to perform a control method of an electronic device comprising: switching, according to an input of an instruction that accompanies switching of an actuation method of an image sensor, the actuation method of the image sensor using either of a first switching method and a second switching method based on a predetermined condition, wherein, in the first switching method, the actuation method is switched via a standby state of the image sensor according to the input of the instruction, and wherein, in the second switching method, the actuation method is switched at a timing of a start of a next frame immediately after the input of the instruction while actuating the image sensor at a predetermined frame rate.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 1 is a block diagram showing a schematic configuration of an image sensor according to an embodiment of the present invention.

FIGS. 4A and 4B are timing charts showing a switching operation of a first actuation switching method according to a first embodiment.

FIGS. 5A and 5B are timing charts showing a switching operation of a second actuation switching method according to the first embodiment in a case where a frame rate of LV image shooting is high.

FIG. 6 is a timing chart showing a switching operation of the second actuation switching method according to the first embodiment in a case where the frame rate of LV image shooting is low.

FIG. 7 is a flowchart showing determination processing of an actuation switching method according to the first embodiment.

FIG. 8 is a flowchart showing determination processing of an actuation switching method according to a modification of the first embodiment.

FIG. 9 is a timing chart showing a switching operation in a case where a frame rate of LV image shooting is low according to the modification of the first embodiment;

FIG. 11 is a timing chart showing a switching operation of the second actuation switching method according to the second embodiment in a case where the frame rate of LV image shooting is low.

FIG. 12 is a flowchart showing determination processing of an actuation switching method according to a third embodiment.

DESCRIPTION OF THE EMBODIMENTS

Figure 2:
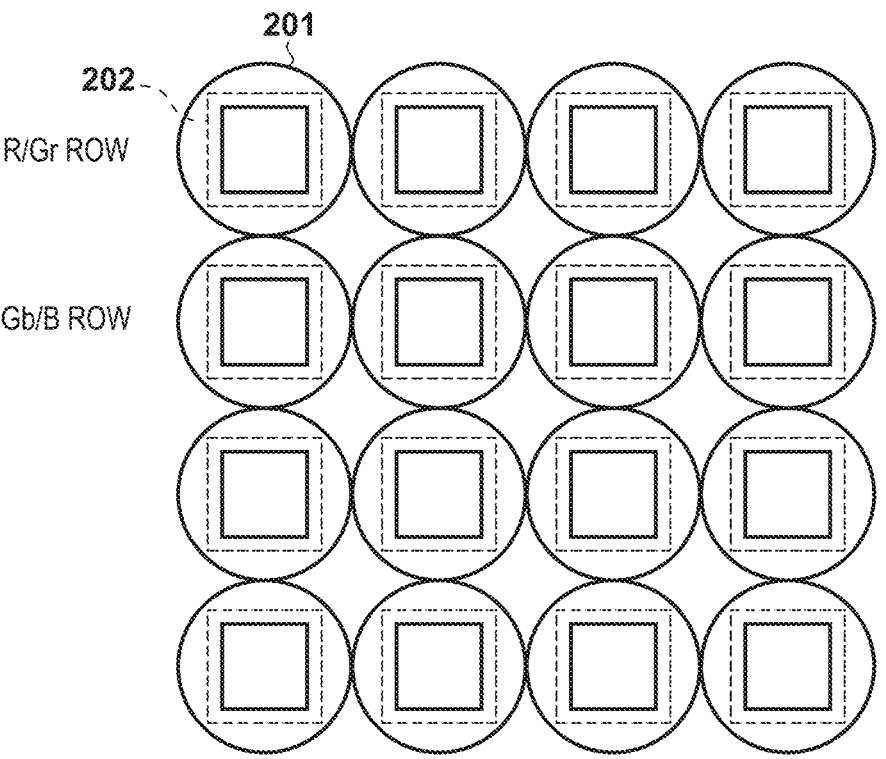
FIG. 2 is a diagram showing a pixel array of the image sensor according to the embodiment.

Hereinafter, embodiments will be described in detail with reference to the attached drawings. Note, the following embodiments are not intended to limit the scope of the claimed invention, and limitation is not made an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

Configuration of Apparatus

FIG. 1 is a block diagram showing a schematic configuration of an image sensor according to a first embodiment of the present invention.

An image sensor 306 has a plurality of pixels 101 arranged in a matrix, and is connected to transfer signal lines 103, reset signal lines 104, and row selection signal lines 105 in the horizontal direction (row direction). Further, the pixels 101 in each row of the image sensor 306 are connected to any of a plurality of vertical output lines 102 provided for each column in the vertical direction (column direction). With this configuration, signals are read out from the pixels in units of a plurality of rows.

Further, the image sensor 306 includes an actuation circuit comprised of column ADC blocks 111, a row scanning circuit 112, column scanning circuits 113, and a timing control circuit 114, a changeover switch 116, and a parallel serial (P/S) conversion unit 117. The changeover switch 116 switches between two image signals output via horizontal signal lines 115-a and 115-b, and outputs the selected image signal.

The timing control circuit 114 controls actuation timing of the image sensor in synchronization with a vertical synchronization signal (VD signal) 118, a horizontal synchronization signal 0 (HD0 signal) 119, and a horizontal synchronization signal 1 (HD1 signal) 120, all of which are input from an overall control calculation unit 309 which will be described later. An SIO communication signal 121 is input to the image sensor 306.

The image signal is subjected to parallel/serial conversion in the P/S conversion unit 117 in accordance with the timing signal from the timing control circuit 114 and sent to the outside of the image sensor 306. As actuation method of the image sensor 306 for reading out an image signal, it is possible to select one of an actuation method of reading out an image signal from all pixels, an actuation method of reading out an image signal from pixels thinned out in the vertical direction by ⅓ or ⅕, an actuation method of reading out an image signal from pixel rows excluding upper and lower portions in the vertical direction, and so forth.

The image sensor 306 is controlled between a standby state, readout state, and exposure state.

In the standby state, reading out of an image signal from the pixels 101 and image data transfer to an image signal processing circuit 307, which will be described later, are not performed. In the readout state, image signals are read out from the pixels 101 and transferred to the image signal processing circuit 307. In the exposed state, the pixels 101 are exposed and charges are accumulated without being read out or without transferring image data to the image signal processing circuit 307.

FIG. 2 is a diagram schematically showing the pixel array of the image sensor 306 covered with color filters 202. As an example, the color filters 202 are arranged in a Bayer pattern, and red (R) and green (Gr) color filters 202 are alternately provided on pixels in odd rows from the left, and green (Gb) and blue (B) color filters are alternately provided on pixels in even rows from the left. Also, an on-chip microlens 201 is formed on the color filter 202.

Figure 3:
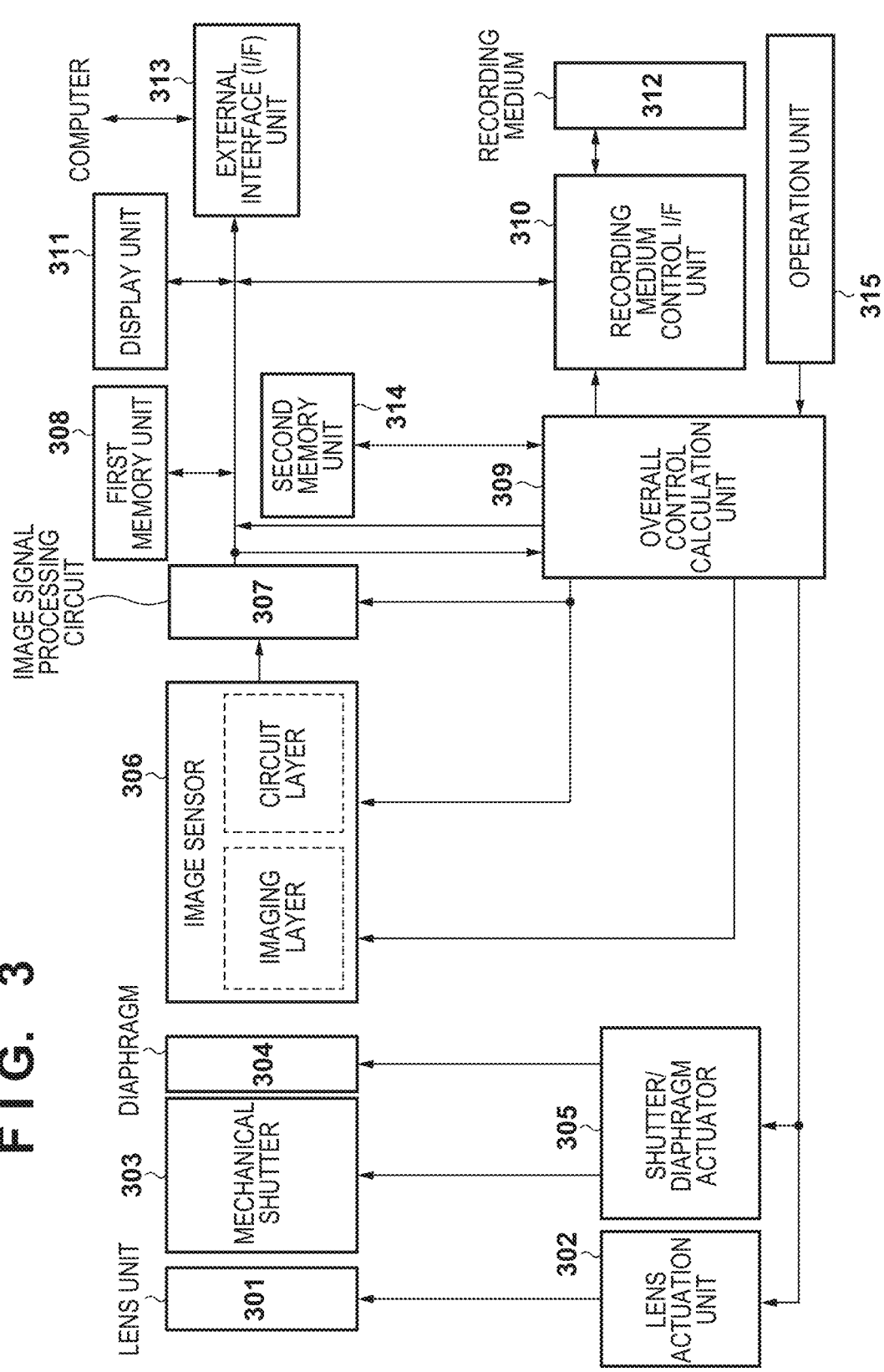
FIG. 3 is a block diagram showing a schematic configuration of an image capturing apparatus according to the embodiment.

FIG. 3 is a block diagram showing a schematic configuration of an image capturing apparatus according to the first embodiment which is provided with the image sensor 306 having the above configuration.

In FIG. 3, a lens actuation unit 302 actuates a lens unit 301 to control the zooming, focusing, etc. of the lens unit 301. A mechanical shutter 303 and a diaphragm 304 are controlled and actuated by a shutter/diaphragm actuator 305. An amount of light of an image of a subject to be incident through the lens unit 301 and the mechanical shutter 303 is appropriately adjusted by the diaphragm 304, and the image is formed on an imaging surface of the image sensor 306 by the lens unit 301.

The image of the subject formed on the imaging surface of the image sensor 306 is photoelectrically converted by the pixels 101 and gain-adjusted, and a resultant analog signal is converted to a digital signal which is captured as signals of R, Gr, Gb and B, and then the digital signal is sent to the image signal processing circuit 307.

An image signal processing circuit 307 performs predetermined arithmetic processing using the image signal output from the image sensor 306, and the overall control calculation unit 309 performs exposure control and focus adjustment control based on the obtained arithmetic results. As a result, TTL (through-the-lens) AF (autofocus) processing, AE (automatic exposure) processing, and EF (automatic flash light emission) processing are performed. By lengthening or shortening the interval between pulses of the VD signal 118 given to the image sensor 306 in AE processing, it is possible to change the frame rate.

Further, the image signal processing circuit 307 performs predetermined arithmetic processing using the image signals output from the image sensor 306, and also performs TTL AWB (auto white balance) processing based on the obtained arithmetic result.

Further, the image signal processing circuit 307 performs defect pixel correction and shading processing on the image signal output from the image sensor 306, and performs development processing. In the development processing, low-pass filter processing for reducing noise, sharpness correction for correcting blurring of the subject, contrast correction for adjusting the contrast of the image, false color correction for correcting false colors, and the like are performed.

The image signal processed by the image signal processing circuit 307 is recorded on a recording medium 312 via a recording medium control interface (I/F) unit 310 or displayed on a display unit 311 according to instructions from the overall control calculation unit 309. The display unit 311 includes an electronic view finder (EVF) and a liquid crystal display (LCD). By sequentially displaying the image signal processed by the image signal processing circuit 307 on the display unit 311 frame by frame, a live view (LV) image can be displayed.

The recording medium 312 is a removable storage medium such as a semiconductor memory, and the image signal recorded on the recording medium 312 can be read out via the recording medium control I/F unit 310.

A first memory unit 308 is used to temporarily store image signals. A second memory unit 314 stores the calculation result of the overall control calculation unit 309.

An external interface (I/F) unit 313 is an interface for communicating with an external computer or the like.

An operation unit 315 is used by the user to input various settings and instructions, and includes a shutter release button for instructing the start of still image shooting, a recording button for instructing the start and end of moving image shooting, a menu button, a playback button for checking the captured image, and so forth.

The shutter release button is a two-stage switch consisting of a switch SW1 and a switch SW2, and the switch SW1 is turned ON in the middle of operation (for example, half-pressing), and preparation for still image shooting such as AF processing, AE processing, AWB processing, EF processing, and so on is instructed. Further, when the operation is completed (for example, full pressing), the switch SW2 is turned ON and still image shooting is instructed.

When the recording button is pressed once, recording of a moving image is instructed, and when the recording button is pressed during recording of the moving image, end of recording the moving image is instructed. Note that the shutter release button and recording button are not limited to these configurations, and any operation member that can instruct the start and end of still image shooting and moving image shooting may be used.

The overall control calculation unit 309 controls the entirety of the image capturing apparatus and performs various calculations. The overall control calculation unit 309 controls the entirety of the image capturing apparatus including an LV mode, still image shooting mode, and moving image shooting mode according to the conditions set by the user using the operation unit 315.

First Actuation Switching Method

FIGS. 4A and 4B are timing charts showing the switching operation of the image sensor 306 by the first actuation switching method in the first embodiment.

In the following description, the image sensor 306 is actuated by a low image quality actuation method in the LV mode, and the image sensor 306 is actuated by a high image quality actuation method in the moving image shooting mode. Further, it is assumed that the frame rate of the image sensor 306 is 30 fps (33 ms) in the LV mode, and 30 fps (33 ms) in the moving image shooting mode. Furthermore, it is assumed that time taken to read out the signal from the image sensor 306 in the LV mode or moving image shooting mode is 2 ms. It is also assumed that the display unit 311 operates at 60 fps in the first embodiment.

Furthermore, in the following description, since the contents of control performed in response to the SIO communication signal 121 are different, the SIO communication signal 121 is described as SIO (1) to (4) communications according to the contents of control in order to distinguish between them.

When the start of moving image recording is instructed from the operation unit 315 during the LV mode, the overall control calculation unit 309 performs SIO(1) communication to send an actuation switching request to the image sensor 306. In the SIO(1) communication, the setting such that the image sensor 306 transits to the standby state at the timing of the next pulse of the VD signal being input is performed. The timing at which this SIO(1) communication is performed changes depending on at which timing in the blanking period the start of moving image recording is instructed.

FIG. 4A is a diagram showing a case where a start of moving image recording is instructed during a setting prohibition period of 1 ms before the input of a pulse of the VD signal. In this case, since the SIO(1) communication is performed immediately after the next pulse of the VD signal is generated, the reading of the signal from the image sensor 306 corresponding to EXPOSURE (n+1) in FIG. 4A is stopped in the middle, and thus an image that should be DISPLAY (n+1) cannot be captured. As a result, an image DISPLAY (n), is continuously displayed on the display unit 311 for two or more frames, which causes a phenomenon in which the displayed image looks temporally stopped.

When the image sensor 306 enters the standby state according to the input of the next pulse of the VD signal through the SIO(1) communication, the overall control calculation unit 309 performs the SIO(2) communication during the standby state. The SIO (2) communication is to change the actuation method of the image sensor 306, send the VD signal and the HD0 signal to the image sensor 306 in accordance with the changed actuation method, set an exposure period via the reset signal lines 104, and further set gains to column ADC blocks 111.

Next, the overall control calculation unit 309 issues the next pulse of the VD signal in synchronization with the display timing of the display unit 311 (Sync synchronization period), the image sensor 306 is changed to the readout state, and EXPOSURE (n+2) by the high image quality actuation is started. Since the sync synchronization period is between 3 ms and 16 ms, it takes about 37 ms at the shortest and about 50 ms at the longest from when the start of moving image recording is instructed until when the image (DIS-PLAY (n+2)) obtained by high image quality actuation is displayed on the display unit 311.

FIG. 4B is a diagram showing a case where the start of moving image recording is instructed immediately after the blanking (BLK) period after completion of a readout operation has started. In this case, the SIO(1) communication is performed immediately after the end of the readout operation. The overall control calculation unit 309 issues a pulse of the VD signal when the SIO(1) communication for an actuation switching request is completed, and shifts the image sensor 306 to the standby state. Image data is not transferred from the image sensor 306 during the standby state of the image sensor 306. Therefore, the image displayed on the display unit 311 is not updated, and the displayed image is temporarily frozen.

When the image sensor 306 becomes the standby state, the overall control calculation unit 309 performs the SIO(2) communication. In the SIO (2) communication, the actuation method of the image sensor 306 is changed, the VD signal and the HD0 signal are sent to the image sensor 306 according to the changed actuation method, an exposure period is set via the reset signal lines 104, and further, set gains to the column ADC blocks 111.

Next, the overall control calculation unit 309 issues the next pulse of the VD signal in synchronization with the display timing of the display unit 311 (Sync synchronization period), the image sensor 306 is changed to the readout state, and EXPOSURE (n+2) by the high image quality actuation is started.

However, since the period during which the image shown as DISPLAY (n+1) is displayed on the display unit 311 is extended by 16 ms, the smoothness of the displayed image is lost and a phenomenon in which the displayed image looks temporally stopped occurs. In addition, since the Sync synchronization period is 3 ms to 16 ms, it takes about 36 ms at the shortest and about 49 ms at the longest since the start of moving image recording is instructed until an image (DISPLAY (n+2)) obtained by the high image quality actuation is displayed on the display unit 311.

Thus, in the first actuation switching method, a phenomenon in which the displayed image looks temporally stopped occurs, but the time taken from when the start of moving image recording is instructed to when a displayed image is changed falls within a range between about 36 ms and about 50 ms.

Second Actuation Switching Method

Figure 5A:
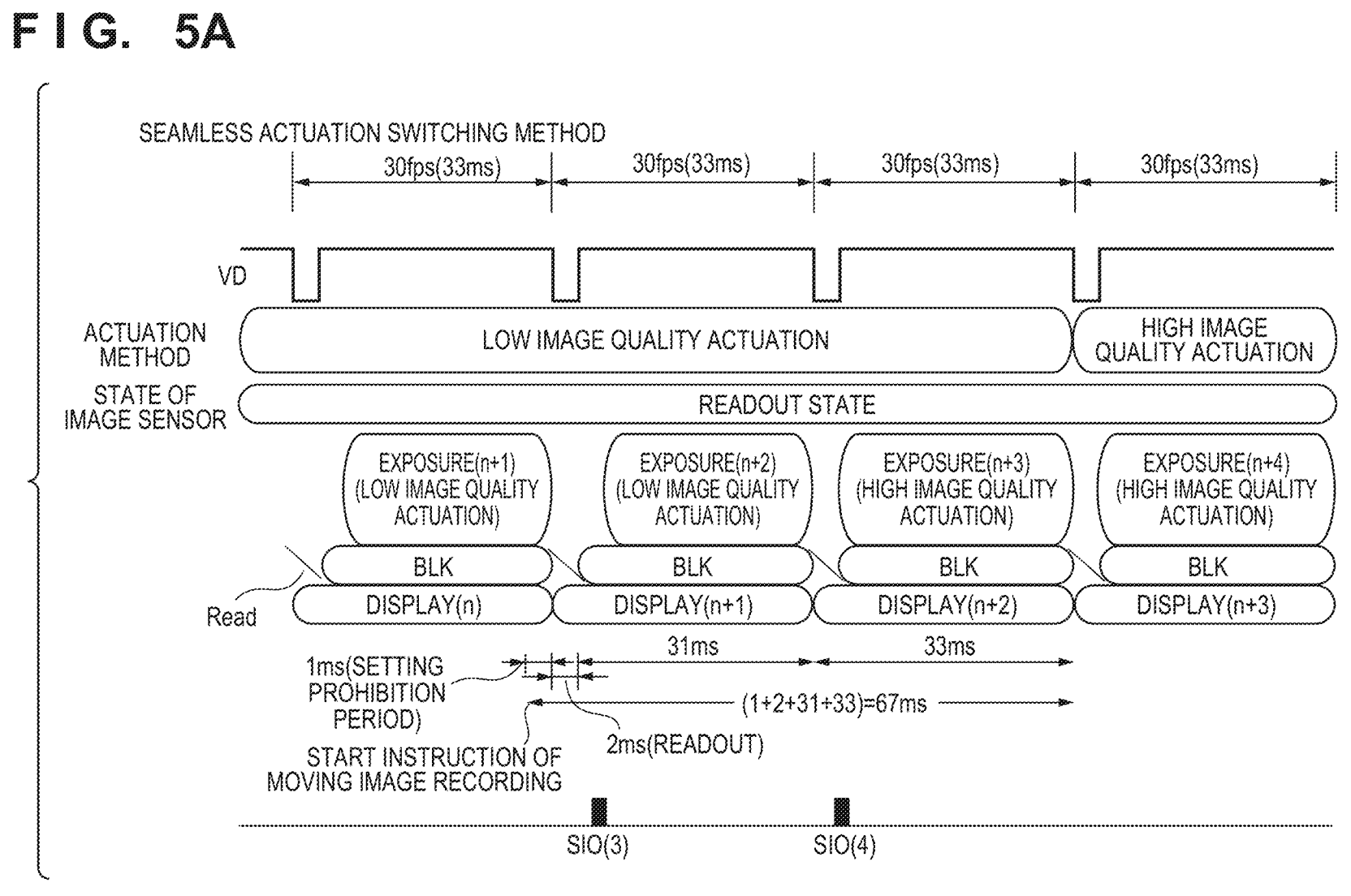

FIGS. 5A and 5B are timing charts showing the switching operation by the seamless actuation switching method as a second actuation switching method of the image sensor 306 in the first embodiment.

In FIGS. 5A and 5B as well, the image sensor 306 is actuated by the low image quality actuation method in the LV mode, and the image sensor 306 is actuated by the high image quality actuation method in the moving image shooting mode. Further, it is assumed that the frame rate of the image sensor 306 is 30 fps (33 ms) in the LV mode, and 30 fps (33 ms) in the moving image shooting mode. Furthermore, it is assumed that time taken to read out the signal from the image sensor 306 in the LV mode or moving image shooting mode is 2 ms. It is also assumed that the display unit 311 operates at 60 fps in the first embodiment.

When the start of moving image recording is instructed from the operation unit 315 during the LV mode, the overall control calculation unit 309 performs SIO(3) communication to send an actuation switching request to the image sensor 306. In the SIO(3) communication, the reading of the signal from the image sensor 306 is set to be performed by the low image quality actuation method and the exposure is set to be performed by the high image quality actuation method at the timing of the next pulse of the VD signal. The timing at which this SIO(3) communication is performed changes depending on at which timing in the blanking period the start of moving image recording is instructed.

FIG. 5A is a diagram showing a case where the start of moving image recording is instructed during a setting prohibition period of 1 ms before the input of a pulse of the VD signal, and showing the case where the longest time will be taken to switch the image after the start of moving image recording is instructed. In this case, the SIO(3) communication is performed immediately after readout of signals started in response to the next pulse of the VD signal is completed.

At this time, if the HD period (horizontal period) differs between the low image quality actuation method and the high image quality actuation method, the HD0 signal is used in the low image quality actuation method, and the HD1 signal is used in the high image quality actuation method to control the actuation timing of the image sensor 306. In addition, the VD signal for the high image quality actuation method is sent to the image sensor 306, an exposure period for the high image quality actuation method is set via the reset signal lines 104, and gains for the low image quality actuation method are set in the column ADC blocks 111.

Next, when a pulse of the VD signal is generated after 33 ms, SIO(4) communication is performed. In the SIO(4) communication, the image sensor 306 is controlled such that the high image quality actuation method will be set for readout and the high image quality actuation method will be set for exposure at the next pulse of the VD signal. Also, an exposure period for the high image quality actuation method is set via the reset signal lines 104, and gains for the high image quality actuation method are set in the column ADC blocks 111.

In this case, it takes about 67 ms from when the start of moving image recording is instructed to when an image (DISPLAY (n+3)) obtained by the high quality actuation is displayed on the display unit 311.

FIG. 5B is a diagram showing a case where the start of moving image recording is instructed 1 ms before the input of a pulse of the VD signal, and shows a case where it takes the shortest time since the start of moving image recording is instructed until an image is switched. Unlike FIG. 5A, the SIO (3) communication is performed immediately after the start of moving image recording is instructed and the SIO(4) communication is performed when a pulse of the VD signal having a period of 33 ms is generated.

In this case, it takes about 34 ms from when the start of moving image recording is instructed until when the display unit 311 displays an image (DISPLAY (n+3)) obtained by the high quality actuation.

In the case of the second actuation switching method shown in FIGS. 5A and 5B, unlike the first actuation switching method shown in FIGS. 4A and 4B, the image sensor 306 is controlled such that the exposure of the image sensor 306 and the readout of a signal from the image sensor 306 are not stopped without transitioning the image sensor 306 to the standby state. For this reason, a phenomenon in which an image displayed on the display unit 311 looks temporally stopped does not occur, as shown by DISPLAY (n), DISPLAY (n+1), DISPLAY (n+2), and DISPLAY (n+3). Also, the time from when the start of moving image recording is instructed to when a displayed image is switched falls within a range between about 34 ms to about 67 ms, which is about the same range as in the first actuation switching method. However, this range becomes longer when the frame rate before the switching is lower.

FIG. 6 is a timing chart showing a seamless actuation switching method when the frame rate of the image sensor 306 is low.

Here, the image sensor 306 is actuated by the low image quality actuation method in the LV mode, and the image sensor 306 is actuated by the high image quality actuation method in the moving image shooting mode. Further, it is assumed that the frame rate of the image sensor 306 is 15 fps (66 ms) in the LV mode, and 30 fps (33 ms) in the moving image shooting mode. Furthermore, it is assumed that time taken to read out the signal from the image sensor 306 in the LV mode or moving image shooting mode is 2 ms.

In FIG. 6, in a case where the start of moving image recording is instructed at timing 1 in the setting prohibition period of 1 ms before a pulse of the VD signal is input, it takes about 100 ms since the start of moving image recording is instructed until an image (DISPLAY (n+2)) obtained by the high quality actuation is displayed on the display unit 311, wherein the 100 ms consists of the setting inhibition period of 1 ms, the 1 VD period of 66 ms, and the EXPOSURE (n+1) period of 33 ms.

On the other hand, if the start of moving image recording is instructed at timing 2 immediately before the setting prohibition period, it takes about 34 ms since the start of moving image recording is instructed until the image (DISPLAY (n+2)) obtained by the high image quality actuation is displayed on the display unit 311, wherein the 34 ms consists of 1 ms until the next pulse of the VD signal is generated and the EXPOSURE (n+2) period of 33 ms. That is, a variation of 66 ms occurs depending on the timing at which the start of moving image recording is instructed.

Thus, in the second actuation switching method, the time taken to switch a displayed image increases as the frame rate of the image sensor 306 actuated by the low quality actuation method becomes lower.

Switching Control of Actuation Method

FIG. 7 is a flowchart showing determination processing of an actuation switching method for suppressing variation in time since the start of moving image recording is instructed until the high quality actuation method is set in the first embodiment.

When a start of moving image recording is instructed, it is determined in step S701 whether the current frame rate is high. Here, the current frame rate is compared with a predetermined threshold value T1 (for example, 30 fps), and if the current frame rate is equal to or higher than the threshold value T1, it is determined that the frame rate is high.

If it is determined that the current frame rate is high, the process proceed to step S702 and it is determined that the second actuation switching method is to be used to switch the actuation method. If it is determined that the current frame rate is not high, the process proceeds to step S703 and it is determined that the first actuation switching method is to be used to switch the actuation method.

As described above, in the first actuation switching method, the displayed image momentarily stops, but the time taken to switch the actuation method falls within a range between about 36 ms at the shortest and about 50 ms at the longest. Therefore, if the current frame rate is not a high frame rate, the first actuation switching method, not the second actuation switching method, can suppress the variation in time taken to switch the actuation method.

On the other hand, if the current frame rate is a high frame rate, the second actuation switching method enables smoother image display than the first actuation switching method, and the variation in time taken to switch the actuation method substantially falls within that of the first actuation switching method.

As described above, according to the first embodiment, a variation in time taken to switch the actuation method can be suppressed while maintaining smoothness of a displayed image as much as possible at the time of switching the actuation method when the LV mode is changed to the moving image shooting mode.

Modification

As shown in FIG. 6, the seamless actuation switching method, which is the second actuation switching method, has the problem that the variation in time taken to switch the actuation method increases as the frame rate becomes low. To solve this problem, in this modification, whether to use the first actuation switching method or the second actuation switching method is determined further based on the timing at which the start of moving image recording is instructed, thereby suppressing the variation in time taken to switch the actuation method while maintaining smoothness of a displayed image.

FIG. 8 is a flowchart showing determination processing of an actuation switching method for suppressing variation in time since the start of moving image recording is instructed until the high quality actuation method is set in this modification. The same step numbers are assigned to the same processes as those shown in FIG. 7, and the description thereof is omitted.

If it is determined in step S701 that the current frame rate is not high, the process proceeds to step S801. In step S801, it is determined whether the time from the timing at which the start of moving image recording is instructed to the timing at which the next pulse of the VD signal is input is equal to or less than a predetermined threshold T2.

If the time is equal to or shorter than the threshold T2, the process proceed to step S702 where it is determined that the second actuation switching method is to be used to switch the actuation method, and if the time is longer than the threshold T2, the process proceed to step S703 where it is determined that the first actuation switching method is to be used to switch the actuation method. Here, it is conceivable that the threshold T2 may be set according to a time taken to switch the actuation method in the first actuation switching method, for example. In the first actuation switching method, there is a maximum of 16 ms of Sync synchronization period before issuing the next pulse of the VD signal in accordance with the display timing of the display unit 311, so the threshold T2 may be 17 ms which is the sum of the 16 ms of Sync synchronization period and the setting prohibition period of 1 ms.

FIG. 9 is a timing chart showing an example of switching operation of an actuation method performed when the start of moving image recording is instructed in a case where the frame rate is low (here, 15 fps). If the start of moving image recording is instructed before 17 ms or less from the next pulse of the VD signal, it is determined that the second actuation switching method is to be used to switch the actuation method. If the start of moving image recording is instructed at other timings, it is determined that the first actuation switching method is to be used to switch the actuation method.

By operating as described above, it is possible to further suppress variation in the time taken for switching the actuation method while maintaining smoothness of a displayed image at the time of switching the actuation method as much as possible.

Note that the present invention is not limited to the above-described embodiments, and can be applied to cases where the actuation method is switched when the LV mode is switched to another LV mode, and the actuation method is switched when the moving image shooting mode is switched to another moving image shooting mode.

Second Embodiment

Next, a second embodiment of the present invention will be described.

In the first embodiment, switching of actuation method of the image sensor 306 when the LV mode is switched to the moving image shooting mode has been described. On the other hand, in the second embodiment, switching of actuation method of the image sensor 306 at the time of switching from the LV mode to the still image shooting mode will be described.

Note that the configuration of the image capturing apparatus in the second embodiment is the same as that described with reference to FIGS. 1 to 3 in the first embodiment, so the description thereof is omitted here.

First Actuation Switching Method

Figure 10:
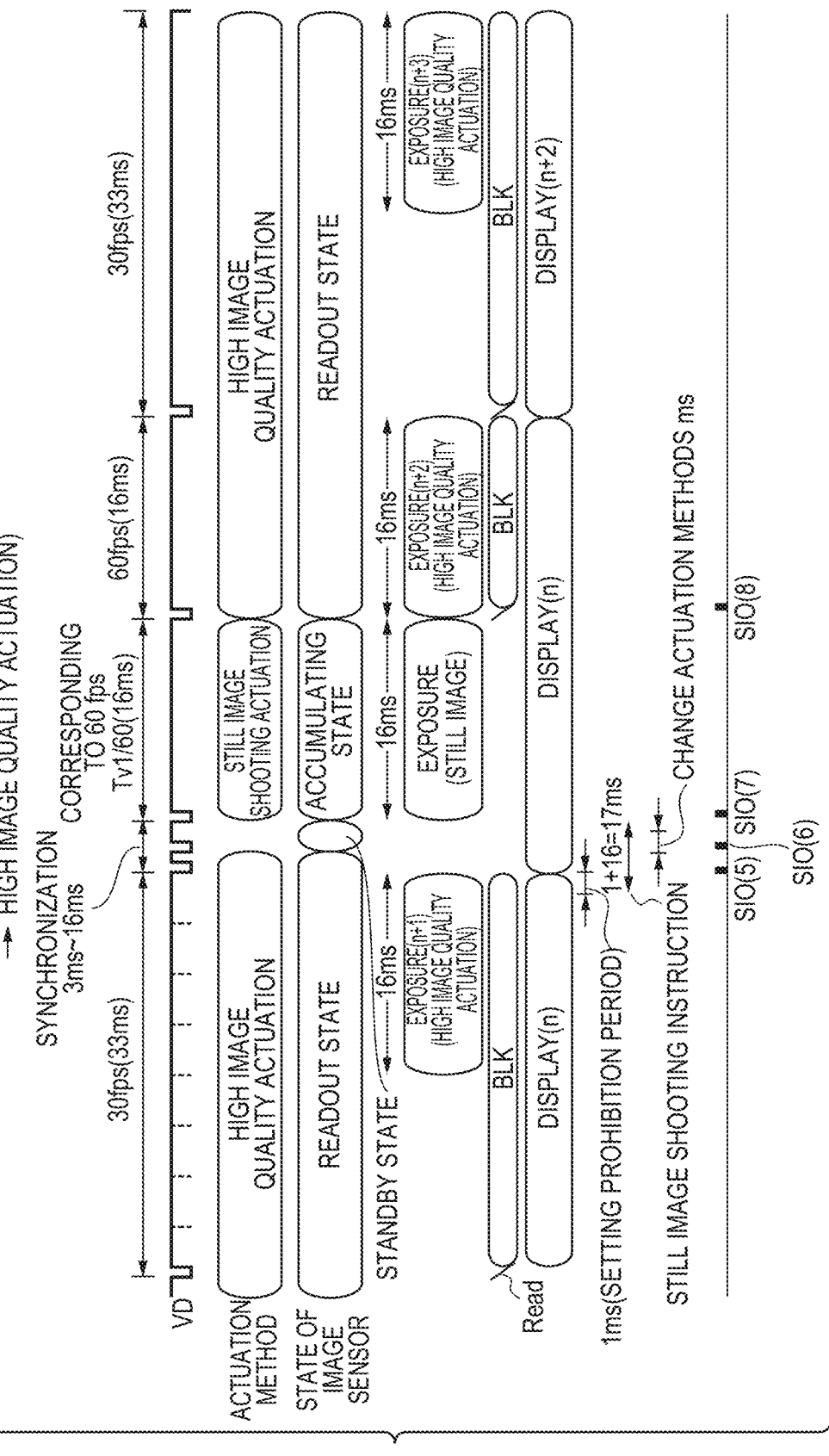
FIG. 10 is a timing chart showing a switching operation of the first actuation switching method according to a second embodiment in a case where the frame rate of LV image shooting is low.

FIG. 10 is a timing chart showing the switching operation for the image sensor 306 by the first actuation switching method in the second embodiment. It should be noted that the case of using the second actuation switching method for switching from the still image shooting mode to the LV mode is shown.

In the following description, the image sensor 306 is actuated by a low image quality actuation method in the LV mode, and the image sensor 306 is actuated by a high image quality actuation method in the still image shooting mode. Further, it is assumed that the frame rate of the image sensor 306 is 30 fps (33 ms) in the LV mode, and 60 fps (16 ms) in the still image shooting mode. Furthermore, it is assumed that time taken to read out the signal from the image sensor 306 in the LV mode or still image shooting mode is 2 ms. It is also assumed that the display unit 311 operates at 30 fps in the second embodiment.

Furthermore, in the following description, since the contents of control performed in response to the SIO communication signal 121 are different, the SIO communication signal 121 is described as SIO (5) to (11) communications according to the contents of control in order to distinguish between them.

When the still image shooting is instructed by turning on the switch SW2 of the operation unit 315 during the LV mode, the overall control calculation unit 309 performs SIO(5) communication to send an actuation switching request to the image sensor 306. In the SIO(5) communication, the setting such that the image sensor 306 transits to the standby state at the timing of the next pulse of the VD signal being input is performed. The timing at which this SIO(5) communication is performed changes depending on at which timing in the blanking period the still image shooting is instructed.

FIG. 10 is a diagram showing a case where a still image shooting is instructed during the setting prohibition period of 1 ms before the a pulse of the VD signal is input, which is a case where it takes the longest time since the still image shooting is instructed until a displayed image is changed. In this case, since the SIO(5) communication is performed immediately after the next pulse of the VD signal is generated, the reading of the signal from the image sensor 306 corresponding to EXPOSURE (n+1) in FIG. 10 is stopped in the middle, and an image that should be DISPLAY (n+1) cannot be captured. As a result, an image DISPLAY (n), is continuously displayed on the display unit 311 for two or more frames, which causes a phenomenon in which the displayed image looks temporally stopped.

When the image sensor 306 enters the standby state according to the input of the next pulse of the VD signal through the SIO(5) communication, the overall control calculation unit 309 performs SIO(6) communication during the standby state. The SIO (6) communication is to change the actuation method of the image sensor 306, send the VD signal and the HD0 signal to the image sensor 306 in accordance with the changed actuation method, set an exposure period via the reset signal lines 104, and further set gains to column ADC blocks 111.

Next, the overall control calculation unit 309 issues the next pulse of the VD signal in synchronization with the display timing of the display unit 311 (Sync synchronization period), the image sensor 306 is changed to the accumulation state, and an exposure for the still image shooting is started. Since the sync synchronization period is between 3 ms and 16 ms, it takes about 17 ms at the longest from when the actuation switching request is input to when the exposure for the still image shooting is started.

Next, when charge accumulation for a still image is completed, a pulse of the VD signal is issued and SIO(7) communication is performed. In the SIO(7) communication, the reading of the signal from the image sensor 306 is set to be performed by the still image shooting actuation method and the exposure is set to be performed by the high image quality actuation method at the timing of the next pulse of the VD signal. If the HD period (horizontal period) differs between the still image shooting actuation method and the high image quality actuation method, the HD0 signal is used in the still image shooting actuation method, and the HD1 signal is used in the high image quality actuation method to control the actuation timing of the image sensor 306. In addition, the VD signal for the high image quality actuation method is sent to the image sensor 306, an exposure period for the high image quality actuation method is set via the reset signal lines 104, and gains for a still image are set in the column ADC blocks 111.

Next, when a pulse of the VD signal is generated 16 ms later, SIO(8) communication is performed. In the SIO(8) communication, the reading of the signal from the image sensor 306 is set to be performed by the high quality actuation method and the exposure is set to be performed by the high image quality actuation method at the timing of the next pulse of the VD signal. Further, an exposure period for the high image quality actuation method is set via the reset signal lines 104, and gains for the high image quality actuation method are set in the column ADC blocks 111.

Since the Sync synchronization period is between 3 ms and 16 ms, in this case, it takes about 37 ms at the shortest and about 50 ms at the longest from when the still image shooting instruction is input until when an image (DISPLAY (n+2)) obtained next by the high image quality actuation is displayed in the display unit 311. Note that if the still image shooting instruction is input at other timing than the setting prohibition period, the SIO(5) communication is immediately performed, so it takes about 36 ms at the shortest and about 49 ms at the longest.

As described above, in the first actuation switching method, a phenomenon in which the displayed image looks temporally stopped occurs, but the time taken from when the still image shooting instruction is input until when a displayed image is changed falls within a range between about 36 ms and about 50 ms. Further, as described above, it takes about 17 ms at the longest from when the still image shooting instruction is input until an exposure by the still image shooting actuation is started.

Second Actuation Switching Method

FIG. 11 is a timing chart showing the switching operation by the seamless actuation switching method as the second actuation switching method of the image sensor 306 in the second embodiment. Also, a case in which the second actuation switching method is used for switching from the still image shooting mode to the LV mode is shown.

In FIG. 11, too, the image sensor 306 is actuated by the low image quality actuation method in the LV mode, and the image sensor 306 is actuated by the high image quality actuation method in the still image shooting mode. Further, it is assumed that the frame rate of the image sensor 306 is 30 fps (33 ms) in the LV mode, and 60 fps (16 ms) in the still image shooting mode. Furthermore, it is assumed that time taken to read out the signal from the image sensor 306 in the LV mode or still image shooting mode is 2 ms. It is also assumed that the display unit 311 operates at 30 fps in the second embodiment.

When still image shooting is instructed by the operation unit 315 during the LV mode, the overall control calculation unit 309 performs SIO (9) communication as an actuation switching request to the image sensor 306. In the SIO(9) communication, the reading of the signal from the image sensor 306 is set to be performed by the high image quality actuation method and the exposure is set to be performed by the still image shooting actuation method at the timing of the next pulse of the VD signal. If the HD period (horizontal period) differs between the high image quality actuation method and the still image shooting actuation method, the HD0 signal is used in the high image quality actuation method, and the HD1 signal is used in the still image actuation method to control the actuation timing of the image sensor 306. In addition, the VD signal for the still image shooting actuation method is sent to the image sensor 306, an exposure period for the still image actuation method is set via the reset signal lines 104, and gains for the high image quality actuation method are set to the column ADC blocks 111.

Here, in a case where a still image shooting instruction is input at timing 1 in the setting prohibition period of 1 ms before a pulse of the VD signal is input, it takes about 34 ms since the still image shooting instruction is input until an exposure of the still image shooting is started, wherein the 34 ms consists of the setting inhibition period of 1 ms, and the 1 VD period of 33 ms.

On the other hand, if the still image shooting instruction is input at timing 2 immediately before the setting prohibition period, it takes about 1 ms since the still image shooting instruction is input until an exposure of the still image shooting is started, which corresponds to 1 ms of the setting inhibition period. That is, a variation of 33 ms occurs depending on the timing at which the still image shooting instruction is input.

Next, when a pulse the VD signal is generated after 16 ms, SIO (10) communication is performed. In the SIO(10) communication, the image sensor 306 is controlled such that the still image shooting actuation method will be set for readout and the high image quality actuation method will be set for exposure at the next pulse of the VD signal. In addition, the VD signal for the high quality image actuation method is sent to the image sensor 306, an exposure period for the high quality image actuation method is set via the reset signal lines 104, and gains for the still image shooting actuation method are set to the column ADC blocks 111.

Next, when a pulse of the VD signal is generated after 16 ms, SIO (11) communication is performed. In the SIO(11) communication, the image sensor 306 is controlled such that the high quality actuation method will be set for readout and the high image quality actuation method will be set for exposure at the next pulse of the VD signal. In addition, an exposure period for the high quality image actuation method is set via the reset signal lines 104, and gains for the high quality image actuation method are set to the column ADC blocks 111.

Switching Control of Actuation Method

In the second embodiment, too, as shown in the flowchart of FIG. 7 in the first embodiment, in a case where the frame rate before switching the actuation method is low, the first actuation switching method, not the second actuation switching method, is used, thereby suppressing the variation in time from when the still image shooting instruction is input to when switching to the still image shooting actuation method is performed. However, in the example of the second embodiment, in the determination in step S701, for example, a frame rate of 60 fps or more is determined to be the high frame rate.

It should be noted that the switching method may be determined as shown in the flowchart of FIG. 8 in the modification described above. In that case, the threshold T2 may be set to 17 ms, which is the longest time in the first actuation switching method, for example.

As described above, according to the second embodiment, a variation in time taken to switch the actuation method can be suppressed while maintaining smoothness of a displayed image as good as possible at the time of switching actuation method from the LV mode to the still image shooting mode.

Note that the present invention is not limited to the above-described embodiments, and can be applied to cases where the actuation method is switched from the moving image shooting mode to the still image shooting mode, and the actuation method is switched from the still image shooting mode to the moving image shooting mode.

Third Embodiment

Next, a third embodiment of the present invention will be described.

In the third embodiment, another method for determining which of the first actuation switching method and the second actuation switching method should be used at the time of switching the actuation method of the image sensor 306 will be described.

Note that the configuration of the image capturing apparatus in the third embodiment is the same as that described with reference to FIGS. 1 to 3 in the first embodiment, so the description thereof is omitted here.

FIG. 12 is a flowchart which shows the processing for determining which of the first actuation switching method and the second actuation switching method is to be used in a case where an instruction involving switching of the actuation method of the image sensor 306, such as an instruction to start moving image recording or a still image shooting instruction, is input according to the third embodiment.

Here, for example, in a case of displaying an image using an EVF, the image sensor 306 is actuated by ⅓ thinning readout in the vertical direction, and in a case of displaying an image using an LCD, the image sensor 306 is actuated by ⅕ thinning readout in the vertical direction. Thus, in a case of switching the display unit 311 between the EVF and the LCD according to an operation to the operation unit 315, the actuation method of the image sensor 306 is also switched.

When the determination processing of the actuation switching method is started, in step S1101, it is determined whether or not the switching of the actuation method of the image sensor 306 accompanies the switching between the EVF and the LCD of the display unit 311.

If it is determined that the switching of the actuation method of the image sensor 306 is due to the switching between the EVF and the LCD, the process proceeds to step S1102 and it is determined that the first actuation switching method is to be used to switch the actuation method. If it is determined in step S1101 that the switching of the image sensor 306 is not due to switching between the EVF and the LCD, the process proceeds to step S1103.

In step S1103, it is determined whether the switching of the actuation method of the image sensor 306 is due to switching from a moving image shooting mode to another moving image shooting mode. For example, the moving image shooting mode with 4K recording size (i.e., a shooting mode of reading out the signals from all pixels and generating a moving image of 4K recording size) is changed to the moving image shooting mode with the FHD recording size (i.e., a shooting mode of reading out the signals by ½ thinning in the vertical direction and generating a moving image of the FHD recording size).

If it is determined in step S1103 that the switching of the actuation method of the image sensor 306 is due to switching from a moving image shooting mode to another moving image shooting mode, the process proceeds to step S1108 to perform the switching of the actuation method by the second actuation switching method. If it is determined in step S1103 that the switching of the actuation method of the image sensor 306 is not due to switching from a moving image shooting mode to another moving image shooting mode, the process proceeds to step S1104.

In step S1104, it is determined whether or not the switching of the actuation method of the image sensor 306 is due to switching to a shooting mode in which an image is not displayed. The shooting mode in which no image is displayed is, for example, a shooting mode in which signals are read out from pixels by 1/32 thinning in the vertical direction in order to detect flicker.

If it is determined in step S1104 that the switching of the actuation method of the image sensor 306 is due to the switching to the image shooting mode in which the image is not displayed, the process proceeds to step S1102, and it is determined that the first actuation switching method is to be used to switch the actuation method. If it is determined in step S1104 that the switching of the actuation method of the image sensor 306 is not due to the switching to the image shooting mode in which the image is not displayed, the process proceeds to step S1105.

In step S1105, it is determined whether or not switching of the actuation method of the image sensor 306 is due to switching to a shooting mode that accompanies a change in angle of view. The shooting mode that accompanies a change in angle of view is, for example, a shooting mode in which image data is read out by cropping the signal in the vertical direction so as to enlarge the image.

If it is determined in step S1105 that the switching of the actuation method of the image sensor 306 is due to switching to the shooting mode that accompanies a change in angle of view, the process proceeds to step S1102, and it is determined that the first actuation switching method is to be used to switch the actuation method. If it is determined in step S1105 that the switching of the actuation method of the image sensor 306 is due to switching to the shooting mode that accompanies a change in angle of view, the process proceeds to step S1106.

In step S1106, it is determined whether or not switching of the actuation method of the image sensor 306 is due to a change in subject luminance, in such a case as the subject becoming bright. If it is determined in step S1106 that the switching of the actuation method of the image sensor 306 is not due the subject becoming bright, the process proceeds to step S1102, it is determined that the first actuation switching method is to be used to switch the actuation method. If it is determined in step S1106 that the switching of the actuation method of the image sensor 306 is due to the subject becoming bright, the process proceeds to step S1107.

In step S1107, it is determined whether or not the timing at which an actuation method switching request is issued is within a period of a predetermined threshold value T2 before the next pulse of the VD signal is generated. If it is determined in step S1107 that the timing at which the actuation method switching request for switching the actuation method of the image sensor 306 is issued is within the period of the threshold value T2 before the next pulse of the VD signal is generated, the process proceeds to step S1108, and it is determined that the second actuation switching method is to be used to switch the actuation method.

If it is determined in step S1107 that timing at which the actuation method switching request for switching the actuation method of the image sensor 306 is issued is not within the period of the threshold value T2 before the next pulse of the VD signal is generated, the process proceeds to step S1102, and it is determined that the first actuation switching method is to be used to switch the actuation method.

As described above, a variation in time taken to switch the actuation method can be suppressed while maintaining smoothness of a displayed image as good as possible at the time of switching the actuation method by changing between first actuation switching method and the second actuation switching method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-191441, filed Nov. 25, 2021 which is hereby incorporated by reference herein in its entirety.

What is claimed is:

1. An image capturing apparatus comprising:
an image sensor; and
one or more processors and/or circuitry which function as:
    an image processor that performs predetermined signal processing on an image signal output from the image sensor and outputs resultant image data;
    a display unit that displays an image based on the image data undergone the predetermined signal processing by the image processor; and
    a controller that switches an actuation method of the image sensor from a first actuation method to a second actuation method using either of a first switching method and a second switching method according to a frame rate of the image capturing apparatus,
wherein, in the first switching method, the image displayed on the display unit is stopped at a time of switching from the first actuation method to the second actuation method, and
wherein, in the second switching method, the image displayed on the display unit is not stopped at the time of switching from the first actuation method to the second actuation method.

2. The image capturing apparatus according to claim 1, wherein
in a case where the frame rate before switching the actuation method of the image sensor is less than a predetermined first threshold, the controller switches the actuation method using the first switching method, and
in a case where the frame rate before switching the actuation method of the image sensor is equal to or greater than the first threshold, the controller switches the actuation method using the second switching method.

3. The image capturing apparatus according to claim 1, wherein
in a case where the frame rate before switching the actuation method of the image sensor is less than a predetermined first threshold and a timing at which changing of the actuation method of the image sensor is instructed is before a period of a predetermined second threshold from the start of the next frame, the controller switches the actuation method using the first switching method, and
in the other cases, the controller switches the actuation method using the second switching method.

4. The image capturing apparatus according to claim 1, wherein an instruction to switch the actuation method of the image sensor is based on an instruction to record a moving image issued during a live view image is displayed on the display unit, or an instruction to perform still image shooting issued during a live view image is displayed on the display unit.

5. The image capturing apparatus according to claim 1, wherein
in a case where brightness of a subject is brighter than a predetermined brightness and a timing at which changing of the actuation method of the image sensor is instructed is within a period of a predetermined second threshold from the start of the next frame, the controller switches the actuation method using the second switching method, and
in a case where the brightness of the subject is not brighter than the predetermined brightness or the timing at which the changing of the actuation method of the image sensor is instructed is before the period of the second threshold from the start of the next frame, the controller switches the actuation method using the first switching method.

6. The image capturing apparatus according to claim 1, wherein, in a case of, while performing moving image recording, switching to another moving image recording with a different resolution, the controller switches the actuation method using the second switching method.

7. A control method of an image capturing apparatus comprising:
performing predetermined signal processing on an image signal output from an image sensor and outputting resultant image data;
displaying an image based on the image data undergone the predetermined signal processing; and
switching an actuation method of the image sensor from a first actuation method to a second actuation method using either of a first switching method and a second switching method according to a frame rate of the image capturing apparatus,
wherein, in the first switching method, the image displayed on the display unit is stopped at a time of switching from the first actuation method to the second actuation method, and
wherein, in the second switching method, the image displayed on the display unit is not stopped at the time of switching from the first actuation method to the second actuation method.

8. A non-transitory computer-readable storage medium, the storage medium storing a program that is executable by the computer, wherein the program includes program code for causing the computer to perform a control method of an image capturing apparatus comprising:
performing predetermined signal processing on an image signal output from an image sensor and outputting resultant image data;

displaying an image based on the image data undergone the predetermined signal processing; and switching an actuation method of the image sensor from a first actuation method to a second actuation method using either of a first switching method and a second switching method according to a frame rate of the image capturing apparatus, wherein, in the first switching method, the image displayed on the display unit is stopped at a time of switching from the first actuation method to the second actuation method, and wherein, in the second switching method, the image displayed on the display unit is not stopped at the time of switching from the first actuation method to the second actuation method.

* * * * *